United States Patent Office 2,726,928
Patented Dec. 13, 1955

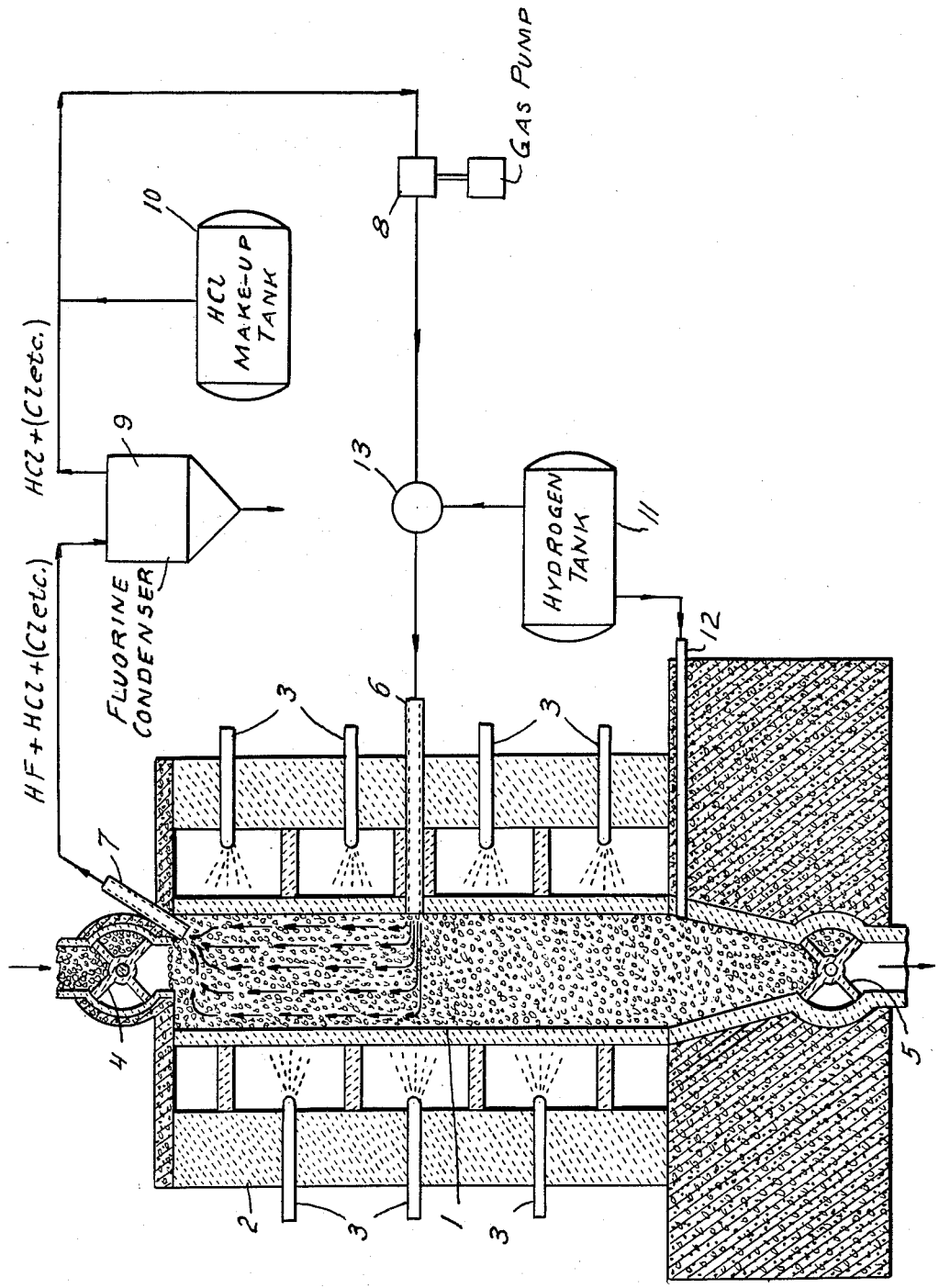

2,726,928

RECOVERY OF FLUORINE FROM PHOSPHATE ROCK

Clinton A. Hollingsworth, Lakeland, Fla., assignor to Smith-Douglass Company, Incorporated, Norfolk, Va., a corporation of Virginia Application September 18, 1952, Serial No. 310,207

1 Claim. (Cl. 23—88)

This invention relates to the recovery of fluorine from phosphate rock and similar fluorine-containing phosphatic materials, and has for its object the provision of an improved method of recovering fluorine therefrom.

Fluorine is present in practically all natural phosphate rocks, in amount varying in the different areas in which the rock occurs. The common Florida phosphate rocks (e. g. pebble rock) usually contain from 3.5 to 4% of fluorine. The fluorine is commonly believed to be present as calcium fluoride ($CaF_2$) and also combined with tricalcium phosphate as calcium fluorphosphate or fluorapatite ($Ca_{10}F_2(PO_4)_6$).

In my United States Letters Patent No. 2,531,046, patented November 21, 1950, I have described a process of replacing the fluorine in fluorapatite with chlorine by calcining the fluorapatite in the presence of a gaseous chlorine containing or chloridizing agent such as hydrochloric acid gas, and thereby converting the fluorapatite to chlorapatite ($Ca_{10}Cl_2(PO_4)_6$) containing less than 0.3% of fluorine. Because of its low fluorine content, the chlorapatite product is suitable as an animal feed or mineral supplement, since the substituted chlorine is non-toxic and unobjectionable, but the substitution of chlorine for fluorine in fluorapatite does not break the bond of the apatite lattice, and the chlorapatite product has the same low fertilizer availability as fluorapatite. Hence, the patent further proposes dechlorinating the chlorapatite product by calcination in the presence of water vapor, by procedures similar to those employed for defluorinating fluorapatite, to produce a phosphatic material of high fertilizer availability. While the literature and patent art glibly speak of recovering fluorine in processes of defluorinating phosphate rock by calcination, I know of no commercial operation for defluorinating phosphate rock by calcination in which the evolved fluorine is recovered. On the contrary, the common practice is to blow finely ground limestone into the stack for the exhaust gases from the calcining furnace to convert the evolved fluorine (usually in the form of hydrogen fluoride) to calcium fluoride, which is wasted to the atmosphere along with the exhaust gases. The principal difficulty in recovering fluorine from the exhaust gas of such defluorinating processes is the very great dilution of fluorine therein, and the same difficulty is presented in recovering chlorine in dechlorinating chlorapatite by calcination. Accordingly, it has not been found practical or profitable to recover (in dechlorinating by calcination) the chlorine substituted for fluorine in the fluorapatite, and the cost of this substituted and lost chlorine unfavorably affects the economies of the operation. Even when the chlorapatite product is sold as an animal feed or mineral supplement the cost of the substituted chlorine is frequently an unfavorable economic factor.

The present invention is primarily concerned with the recovery of fluorine from a natural phosphatic material by calcining the material in the presence of hydrochloric acid (hydrogen chloride) gas or equivalent chloridizing gas, and aims not only to recover the fluorine but also to recover chlorine for reuse, so that it is necessary to replace only the chlorine which is unavoidably lost in the operation. A further aim of the invention is to produce, as a by-product, a partially defluorinated phosphatic product which can readily be substantially defluorinated by subsequent calcination to produce a marketable phosphate product suitable both as a fertilizer and as a mineral supplement for animal feed.

In accordance with the invention, the phosphatic material containing fluorapatite is subjected to calcination at a temperature of at least 1400° F. but not so high that substantial fusion takes place in the presence of a gaseous chlorine-containing or chloridizing agent until a large part (i. e. at least half) of the fluorine of the fluorapatite has been replaced by chlorine with volatilization of the replaced fluorine. The resulting material without cooling is subjected to continued calcination at about the same temperature, in the absence of any intentional or functional presence of chloridizing agent, until a major part (i. e. at least 75% and preferably 90% or more) of the chlorine that replaced fluorine in the fluorapatite during the preceding chloridizing calcination has been volatilized. The volatilized chlorine passes into the material undergoing chloridizing calcination. All of the gaseous products of the two successive calcination treatments or stages are withdrawn as a gaseous mixture containing the volatilized fluorine, the necessary excess of the chloridizing agent and (depending upon the composition of the chloridizing agent) chlorine, water vapor, hydrogen, ammonia etc. At least part of the fluorine content of the gaseous mixture is recovered by condensation, absorption or otherwise, and the residual gaseous mixture is, for the most part, returned as chloridizing agent to the chloridizing calcination of the same or fresh material.

The fluorine content of the gaseous mixture of the calcination treatments may be separated and recovered therefrom by various procedures. When hydrogen chloride or chlorine is the gaseous chloridizing agent, the mixture will contain hydrogen fluoride and hydrogen chloride, and the hydrogen fluoride can be condensed (boiling point 19.4° C.), leaving the hydrogen chloride in the mixture for reuse in the chloridizing calcination. Alternatively, the hydrogen chloride can be condensed (critical pressure 81.6 atmospheres; critical temperature 51.4° C.) and reused, and the hydrogen fluoride in the residual gaseous mixture can then be condensed, or absorbed in water or other suitable solvent, or made into various fluorine compounds. Both the hydrogen fluoride and the hydrogen chloride may be absorbed in water, or other suitable solvent, and separated by distillation with or without a selective azeotrope. When the chloridizing agent is ammonium chloride, the ammonium chloride and ammonium fluoride in the gaseous mixture may be separated by differential crystallization.

In defluorinating phosphate rock by the chloridizing calcination of my aforementioned patent, or by simple calcination in the presence of water vapor, about half of the fluorine content of the fluorapatite is removed with comparative ease, while the removal of the last one-third or so of the fluorine is much more difficult. In practicing the present invention, undue effort is not made to remove this last one-third of the fluorine, and hence the final calcine usually contains from 0.5 to 2% of fluorine, and is consequently not suitable for use as either a mineral supplement or fertilizer. On the other hand, a large part of the fluorine content of the fluorapatite is removed and volatilized in the chloridizing calcination of the invention, and by "large" I mean at least 50% and preferably 75% or more of the fluorine. Because of the removal of the more easily volatilizable fluorine, the final calcine can be readily defluorinated in a subsequent calcination at a temperature above 2400° F., but not so high that substantial fusion takes place, in the presence of water vapor, and usually without resort to additive agents or other measures for increasing the refractoriness of the calcining charge. Thus, the invention, in addition to its primary purpose of recovering fluorine from phosphatic materials containing fluorapatite, serves as a preparatory or conditioning step for the substantially complete defluorination of such materials in a subsequent and comparatively simple calcination step.

The foregoing and other novel features of the invention will be best understood from the following description taken in conjunction with the accompanying drawing in which the single figure is a sectional elevation, partly in the form of a diagrammatic flow sheet, of an apparatus for practicing the invention.

The calcining furnace comprises a vertically positioned retort 1, of silicon carbide or equivalent heat-refractory and corrosion-resistant material, suitably mounted in a furnace structure 2 of fire brick or the like. The retort 1 is externally heated by fuel burners 3 projecting into the heating compartment between the retort and the walls of the furnace structure, the products of combustion being withdrawn from the heating compartment through an appropriate opening or openings (not shown) in the furnace structure. The retort may of course be heated in any other suitable manner, as for example by electric resistance elements, the particular means of heating being unimportant so long as reasonably accurate control of the calcining temperature within the retort 1 is attainable.

The phosphatic material to be calcined is introduced into the top of the retort 1 through a star-wheel feeding device 4, and calcined product is discharged from the bottom of the retort through a star-wheel discharge device 5. Calcination is conducted in a substantially continuous manner, as the material undergoing calcination travels by gravity downwardly through the retort, the duration of calcination, that is the detention period at the contemplated calcining temperature, being determined by the rate of introduction of fresh material suitably correlated to the rate of discharge of calcined product.

The gaseous chloridizing agent is introduced into the retort, about midway of its length within the furnace structure, through a pipe 6. The gaseous mixture containing all of the gaseous products of the calcining treatments is withdrawn from the top of the retort through a pipe 7. The upper half of the retort, that is the part above the pipe 6, is the zone or stage in which the chloridizing calcination is carried out, and in which chlorine replaces at least a large part of the fluorine in the fluorapatite, and the lower half of the retort is the zone or stage in which the dechloridizing calcination is carried out and in which a large part of the substituted chlorine is removed from the chlor-fluorapatite. In its passage through the retort, the material is subjected to a calcining temperature within the range of 1400 to 2200° F. in both the chloridizing and dechloridizing zones. Uniform heating of the entire body of the calcining charge is promoted by the rising gas currents which act as very efficient carriers of heat from the hot wall (or walls) of the retort to the interior of the charge. In the presence of the same excess of chloridizing gas, the higher the chloridizing temperature, the shorter is the time required for effecting a predetermined removal of fluorine, or the greater is the fluorine removal for the same detention time.

The physical character of the phosphatic material is not of special importance so long as it is in a condition that insures intimate contact of the gaseous chloridizing agent with the entire body of the calcining charge. Thus, the material should be in such physical condition that the chloridizing gas readily penetrates into the interiors of all the particles, aggregates and agglomerates of the charge. Unground and naturally granular phosphate rock products, such as flotation concentrates or screened pebble rock, usually possess adequate natural porosity (10–30% voids) for such porosity, and because of their ease of handling are suitable, and often preferable, types of feed. Finely ground phosphatic material (e. g. 65% minus a 200 mesh standard Tyler screen and all through a 65 mesh screen) should be formed into porous nodules or the like, as described in my aforementioned patent, in order to insure adequate penetration of the chloridizing gas.

While any chloridizing agent whose chlorine content is capable of replacing fluorine in fluorapatite at a temperature between 1400 and 2200° F. may be used in practicing the invention, I have found hydrogen chloride (HCl), ammonium chloride (NH4Cl) and chlorine most readily available and presently best adapted for the purpose. When chlorine is used as the chlorodizing gas, sufficient water vapor should be associated therewith to form hydrogen fluoride (hydrofluoric acid —HF) with all of the volatilized fluorine which is replaced by chlorine during the chloridizing calcination. When ammonium chloride is used as the source of chlorine, the volatilized fluorine combines with ammonia to form ammonium fluoride (NH4F). Several advantages result from the use of ammonium chloride rather than hydrogen chloride. In the first place ammonium chloride is non-toxic and safer to handle. Additionally, ammonium chloride and ammonium fluoride are relatively non-corrosive, as contrasted with hydrogen chloride and hydrogen fluoride, and cheaper, simpler and less corrosive-resistant materials may be used in the construction of the calcining retort and associated apparatus for practicing the invention.

For the purposes of explanation, and merely by way of example, the diagrammatic flow sheet of the accompanying drawing illustrates a practice of the invention in which the chloridizing agent is dry hydrogen chloride gas. The porous granules or nodules of phosphatic material, charged into the retort through the feeding device 4, are promptly heated to the contemplated temperature of the chloridizing calcination. The rising stream of hydrogen chloride gas (indicated by the arrows) passes through the descending calcining charge, the movement of the charge and chloridizing gas being countercurrentwise. Part, or substantially all if desired, of the fluorine in the fluorapatite is replaced by chlorine at a temperature below that at which fluorine can be normally evolved by heat alone. With hydrogen chloride, fluorine is volatilized as hydrogen fluoride, the over-all reaction being as follows:

$$2HCl + CaF_2 \rightarrow CaCl_2 + 2HF$$

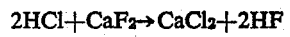

With ammonium chloride, the over-all reaction may be represented as follows:

$$2NH_4Cl + CaF_2 \rightarrow CaCl_2 + 2NH_4F$$

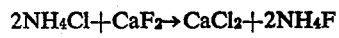

An excess of the chloridizing gas should be present, so that the gaseous product of the chloridizing calcination is mainly a mixture of the replaced and volatilized fluorine (as HF or NH4F) and the excess chloridizing gas.

Following the chloridizing calcination, the calcining charge passes directly and without cooling or loss of heat to the dechloridizing calcination in the lower half of the retort, where the chlorine content of the chlorinated phosphatic material is volatilized by simply continuing the heat-treatment. I have found that the chlorapatite bond is not very tight shortly after chlorine has replaced fluorine in fluorapatite and prior to cooling of the chlorapatite. Once the chlorapatite has been cooled the chlorine becomes tightly bound in the chlorapatite lattice. Hence, when the chlorapatite has been cooled, dechlorination becomes decidedly more difficult and higher temperatures are necessary as well as an atmosphere of water vapor. In dechlorinating the chlorapatite directly after the preceding chloridizing calcination and without cooling, I have found that substantially all of the chlorine that replaced fluorine in the fluoapatite is volatilized by simple calcination at about the same temperature as that of the chloridizing calcination. No chloridizing agent, other than that evolved in consequence of the continued calcination, is present during the dechloridizing calcination.

The chlorine evolved during the dechloridizing calcination passes upwardly and into the charge undergoing the chloridizing calcination and mixes with the gaseous products thereof, so that the gaseous mixture withdrawn from the retort 1 through the pipe 7 contains the fluorine product, excess of the gaseous chloridizing agent and chlorine together with such other gases as may intentionally or otherwise be present. As illustrated in the flow sheet of the accompanying drawing, the gaseous mixture is drawn by a gas pump 8 from the retort and through a condenser 9 where part or all of its fluorine content is removed by condensation. With hydrogen chloride as the chloridizing agent the fluorine will be condensed as hydrogen fluoride. In lieu of the condenser 9, a scrubbing or absorption tower may be used for removal of the fluorine product, or the fluorine product may be recovered as silicon fluoride by passing the gaseous mixture into contact with silica at a temperature below about 1000° F. Complete removal of the fluorine product is not necessary, since the circulating gas system can contain a certain amount of hydrogen fluoride, or equivalent gaseous fluorine product, without detrimental effects. Hydrogen chloride is introduced into the circulating gas system, as for example between the condenser 9 and gas pump 8 from a storage tank 10, in amount sufficient to make-up the losses of chlorine, and to maintain the contemplated excess of hydrogen chloride in the chloridizing zone of the retort 1.

Since the fluorine is condensed as hydrogen fluoride, there is a loss of hydrogen in the circulating gas system, and to make up for this loss hydrogen is introduced into the circuit from a storage tank 11. The hydrogen may be introduced through a pipe 12 into the lower end of the dechloridizing zone of the retort 1, where it passes upwardly through the hot calcining charge and reacts with evolved chlorine, at the calcining temperature, to form hydrogen chloride. By introducing a slight excess of hydrogen for this reaction, little or no free chlorine is present in the gaseous mixture withdrawn through the pipe 7. The reaction between hydrogen and chlorine is exothermic, and when the hydrogen is introduced through the pipe 12, the heat of reaction advantageously supplements the external heating of the retort 1. Alternatively, the hydrogen may be introduced through a burner 13 prior to the return of the residual circulating gas mixture through the pipe 6 to the chloridizing zone of the retort 1. If ammonium chloride is the chloridizing agent, ammonia gas is introduced into the circuit, and if chlorine is the chloridizing agent, water vapor is introduced into the circuit, in a similar manner.

The following examples illustrate practices of the invention with run-of-mine Florida pebble rock and with porous lumps. The pebble rock was screened to minus ½ inch and plus 20 mesh. The porous lumps were made by adding Nacconal (as a fluffing agent) to an aqueous slurry of ground phosphate rock, agitating, drying and sintering in a tunnel furnace. The resulting porous lumps were mostly minus ½ inch and plus ¼ inch. Some of the easy fluorine was volatilized during sintering, which accounts for the relatively low fluorine content of the porous lumps. The chemical analyses of these charge materials were as follows:

|  | $P_2O_5$ | Insol. | $Fe_2O_3$ | $Al_2O_3$ | CaO | F | lbs. per cu. ft. |
|---|---|---|---|---|---|---|---|
| Pebble rock | 35.24 | 4.02 | 1.12 | 0.42 | 49.32 | 4.10 | 87.7 |
| Porous lumps | 36.22 | 5.15 | 1.72 | 1.17 | 51.56 | 2.48 | 24.2 |

The chloridizing agent was hydrogen chloride and an excess thereof was maintained in contact with the charge throughout the chloridizing calcination. The following table gives the essential operating features and the final results:

|  | Chloridizing Calcination | | Dechloridizing Calcination | | Calcine | | Percent F Volatilized |
|---|---|---|---|---|---|---|---|
|  | Time, min. | Temp., °F. | Time, min. | Temp., °F. | Percent F | Percent Cl |  |
| Pebble rock | 45 | 1,800 | 45 | 1,800 | 1.53 | 0.52 | 65.1 |
|  | 45 | 1,975 | 45 | 1,975 | 0.14 | 0.14 | 95.1 |
| Porous lumps | 45 | 1,800 | 45 | 1,800 | 0.32 | 0.24 | 88.3 |
|  | 45 | 1,800 | 45 | 1,800 | 0.62 | 0.07 | 78.4 |

In the foregoing examples, the duration of calcination (in each stage) was considerably longer than actually necessary. I have found that time is not particularly critical factor in the chloridizing calcination. Naturally, some time is required, but the essential condition is to contact the entire body of the calcining charge with an excess of the gaseous chloridizing agent, and from an economic and practical viewpoint the quicker this can be done the better. In the apparatus of the accompanying drawing, a detention period of 10 to 30 minutes at a chloridizing temperature of 1800–2000° F. is usually adequate. The chloridizing gas must be present in sufficient excess to produce a mass reaction that will cause chlorine to replace fluorine in the apatite lattice. At least 10 parts of chlorine should be present during the chloridizing calcination for each part of fluorine to be replaced; spoken of in plant practice as a chlorine to fluorine ratio of 10 to 1 (Cl to F=10). In batch operations, the chlorine to fluorine ratio may be as high as 100, but in a continuous operation, such as illustrated in the accompanying drawing, satisfactory results are usually attained with a chlorine to fluorine ratio of from 10 to 50, determined in the gaseous mixture withdrawn through the pipe 7. As the chlorine to fluorine ratio is increased up to a certain point, the elimination of fluorine sharply increases. At higher chloridizing temperatures, the same elimination of fluorine can be obtained with a lower chlorine to fluorine ratio, and conversely as the chlorine to fluorine ratio is increased the same elimination of fluorine can be obtained at a lower temperature. I have further found that as the chlorine to fluorine ratio is increased, the tendency of charge particles to stick together or to the furnace lining decreases.

The duration of the dechloridizing calcination is about the same as that of the chloridizing calcination. The final calcine may, and usually does, contain too high a fluorine or chlorine (or both) content for direct use as a fertilizer or mineral supplement, but is easily defluorinated and dechlorinated by calcination in the presence of water vapor as hereinbefore described. The losses of fluorine and chlorine that take place in such calcination are relatively insignificant.

In a continuous operation with a circulating gas system, such as illustrated in the accompanying drawing, a build-up of gases other than those desired (e. g. carbon monoxide, carbon dioxide, etc.) frequently occurs, and such gases should be periodically removed, or reduced in amount. This may be done by bleeding-off a small portion of the residual gaseous mixture and passing it through an aqueous absorption tower, where hydrogen chloride is absorbed in water, and the non-soluble gases, such as carbon dioxide etc., escape from the tower. Hydrogen chloride can be distilled off and recovered by heating the aqueous solution thereof after it has built up to a concentration of at least 20% HCl. The regenerated hydrogen chloride should be passed through a drying agent, such as sulphuric acid, before return to the circulating gas system. When both the fluorine and chlorine compounds are condensed together, for example by absorption in water as hereinbefore mentioned, the undesirable gases are removed from the system in the resulting exhaust gas which may be wasted. The build-up of undesirable gases can be reduced by calcining the phosphate rock, before chloridizing, at a temperature high enough to remove organic material and all or part of the carbon dioxide, but not so high as to volatilize an appreciable amount of fluorine.

I claim:

The method of recovering fluorine from a phosphatic material containing fluorapatite which comprises subjecting the phosphatic material to chloridizing calcination in the upper half of an externally heated retort at a temperature within the range of 1400 and 2200° F. in the presence of a chlorine-containing agent selected from the class consisting of hydrogen chloride, ammonium chloride and chlorine and thereby replacing a large part of the fluorine of the fluorapatite with chlorine with volatilization of the replaced fluorine and the production of a calcine containing at least 0.5% fluorine, the chlorine-containing agent being present in such excess that at least 10 parts of chlorine are provided for each part of fluorine to be replaced, subjecting the resulting partially defluorinated calcine without cooling to continued calcination in the lower half of said retort at substantially the same temperature and in a gaseous atmosphere consisting substantially of only such chlorine-containing agent as is evolved therefrom as a consequence of the calcination and thereby volatilizing most of the chlorine that replaced fluorine in the fluorapatite during the preceding chloridizing calcination and producing a calcine containing at least 0.5% fluorine, passing said volatilized chlorine into the material undergoing said chloridizing calcination, withdrawing from the chloridizing calcination the combined gaseous products of the aforesaid successive calcinations consisting for the most part of said volatilized fluorine, said volatilized chlorine and the excess of said chlorine-containing agent, recovering at least part of the fluorine in said withdrawn gaseous products, and returning to the aforesaid chloridizing calcination as chlorine-containing agent substantially all of the chlorine content of said withdrawn gaseous products.

References Cited in the file of this patent
UNITED STATES PATENTS 2,531,046     Hollingsworth     Nov. 21, 1950